(12) United States Patent
Muller

(10) Patent No.: US 9,488,443 B2
(45) Date of Patent: Nov. 8, 2016

(54) METHOD FOR ACQUIRING THE COORDINATES OF A TRIGGERING POINT OF A PROJECTILE AND FIRE CONTROL IMPLEMENTING SUCH A METHOD

(71) Applicant: NEXTER SYSTEMS, Roanne (FR)

(72) Inventor: Sylvain Muller, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 0 days.

(21) Appl. No.: 14/389,220

(22) PCT Filed: Mar. 27, 2013

(86) PCT No.: PCT/FR2013/050656
§ 371 (c)(1),
(2) Date: Sep. 29, 2014

(87) PCT Pub. No.: WO2013/144502
PCT Pub. Date: Oct. 3, 2013

(65) Prior Publication Data
US 2015/0090108 A1    Apr. 2, 2015

(30) Foreign Application Priority Data

Mar. 29, 2012    (FR) ..................................... 12 00953

(51) Int. Cl.
| | | |
|---|---|---|
| *G06G 7/80* | (2006.01) | |
| *F41G 3/16* | (2006.01) | |
| *G01S 17/02* | (2006.01) | |
| *G01S 17/88* | (2006.01) | |
| *G01S 17/89* | (2006.01) | |
| *F41G 1/48* | (2006.01) | |
| *F41G 3/06* | (2006.01) | |
| *G01S 17/06* | (2006.01) | |

(52) U.S. Cl.
CPC . *F41G 3/16* (2013.01); *F41G 1/48* (2013.01); *F41G 3/06* (2013.01); *F41G 3/165* (2013.01); *G01S 17/023* (2013.01); *G01S 17/06* (2013.01); *G01S 17/88* (2013.01); *G01S 17/89* (2013.01)

(58) Field of Classification Search
USPC .................................... 235/404, 411; 434/11
See application file for complete search history.

(56) References Cited

U.S. PATENT DOCUMENTS

| | | | |
|---|---|---|---|
| 4,386,848 A | 6/1983 | Clendenin et al. | |
| 6,422,508 B1 | 7/2002 | Barnes | |
| 2002/0064760 A1* | 5/2002 | Lazecki | F41G 3/2622 434/11 |
| 2003/0140775 A1 | 7/2003 | Stewart | |
| 2003/0224332 A1* | 12/2003 | Trachuk | F41G 3/142 434/11 |

OTHER PUBLICATIONS

International Search Report issued in PCT/FR2013/050656 mailed Jul. 16, 2013.
Written Opinion of the International Search Authority issued in PCT/FR2013/050656 mailed Jul. 16, 2013.

* cited by examiner

*Primary Examiner* — Daniel Hess
(74) *Attorney, Agent, or Firm* — Oliff PLC

(57) ABSTRACT

A method for acquiring the coordinates of a trigger point of a projectile above a plot of land on which a target is located, said method being characterized in that it includes the following steps: performing a three-dimensional acquisition of the plot of land using a laser observation means, constructing by calculation, and then displaying an image of the plot of land from a bird's eye view observation direction, and recovering the coordinates of the trigger point desired for the projectile after the positioning said area on the image of the land. The invention also relates to a fire control implementing such a method.

8 Claims, 2 Drawing Sheets

Figure 1:
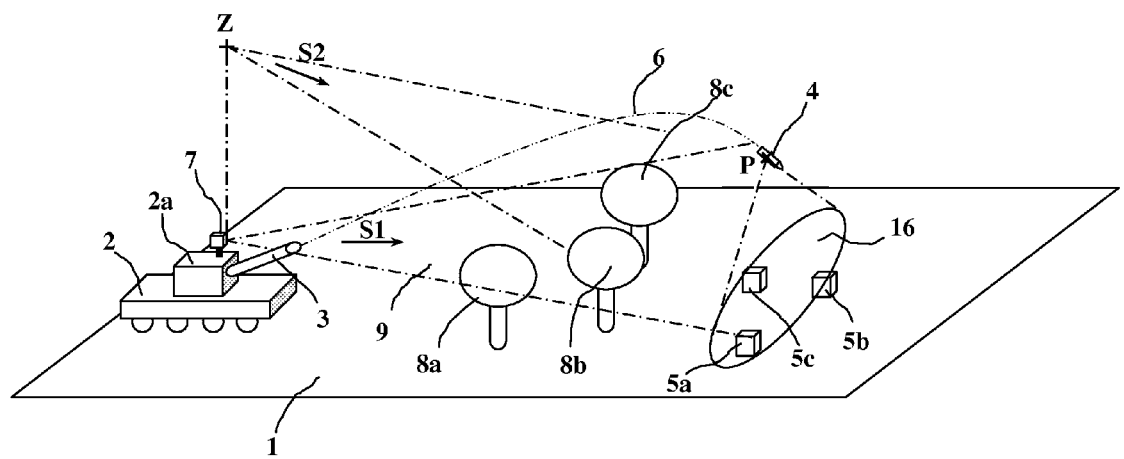

METHOD FOR ACQUIRING THE COORDINATES OF A TRIGGERING POINT OF A PROJECTILE AND FIRE CONTROL IMPLEMENTING SUCH A METHOD

The technical field of the invention relates to that of methods allowing the acquisition of the coordinates of a trigger point of a projectile on trajectory and above a plot of land on which a target is located.

The invention particularly relates to fire controls which can be associated with a weapon firing explosive projectiles, or bursts of such projectiles.

The fire controls allow to provide the coordinates of a trigger point for a projectile fired by the weapon.

It is conventional to implement a fire control associating a laser range-finder and a ballistic computer. The range-finder allows to determine the distance from which a target is located. The computer determines from this distance the elevation and bearing angles to be given to the weapon, as well as the programming which must be given to the projectile to be fired, for example the timing of the firing of the projectile. The known fire controls are particularly well suited when the target is visible, has a sufficient size and is easy to locate, thus when the distance to the target can be easily measured. From patent US 2003/0140775 is known a fire control comprising means for aiming and acquiring a target which allow a three-dimensional reconstruction of the targeted area. The thus-described fire control allows to improve the acquisition of large-size targets (such as vehicles).

However, these fire controls are unsuited to the acquisition of dispersed or hidden, small-size targets. The latter are indeed almost impossible to track by radar. The operator must then perform several adjustment fires for determining the correct distance for triggering the projectiles.

The aim of the invention is to provide a method for acquiring the coordinates of a trigger point of a projectile, method allowing to immediately engage a dispersed or temporarily or partially hidden, small-size target, and with a good probability of interception.

Thus, the invention relates to a method for acquiring the coordinates of a trigger point of a projectile or of a burst of projectiles on trajectory and above a plot of land on which a target is located, method characterized in that it comprises the following steps:

performing a three-dimensional acquisition of the plot of land using a means for laser observation, constructing by calculation from this acquisition, and then displaying on a means for visualization for an operator, an image of the plot of land from a bird's eye view observation direction, that is, an observation direction from a point located at the vertical and higher than the means for observation, positioning, in a manner changeable by the operator, on the thus-calculated image an area of effectiveness which is an image of a geometrical surface or volume allowing to visualize the area or volume of effectiveness of the projectile or of the burst considered when triggered at a trigger point, recovering the coordinates of the trigger point desired for the projectile or the burst when the operator has selected the location that suits him after having moved said area on the image of the land.

According to a particular embodiment, the orientation of the observation direction can be changed by the operator during the acquisition.

The invention also relates to a fire control implementing such a method and which can be associated with a weapon firing projectiles or bursts of projectiles and allowing to provide the coordinates of a trigger point for a projectile or a burst fired by the weapon, fire control characterized in that it comprises:

at least one means for laser observation allowing the three-dimensional acquisition of the coordinates of an observed plot of land, a computer which can reconstruct using an appropriate algorithm at least one image of the plot of land, the coordinates of which have been acquired, which image is displayed on a means for visualization with a bird's eye view observation direction, that is, an observation direction from a point located at the vertical and higher than the means for observation, a means for control for a user and allowing to position and move on the image of the land an area of effectiveness which is itself an image of a geometrical surface or volume allowing to visualize the area or volume of effectiveness of the projectile or of the burst considered when triggered at a trigger point, the computer continuously determining the coordinates of the trigger point when the area of effectiveness is moved by the operator, a means for validation allowing the user to select a particular location of the area of effectiveness, the computer then providing the coordinates of the trigger point desired for the projectile or the burst.

Advantageously, the computer can be associated with first memory means which incorporate a geometrical modeling of the areas of effectiveness for the projectiles or bursts of projectiles associated with different trigger points.

The image of the area of effectiveness can be semi-transparent.

The image of the area of effectiveness can have a color different from that of the rest of the image.

Means for control can allow to change the orientation of the observation direction during the acquisition by an operator.

According to a particular embodiment, the means for observation is an optical or thermal camera coupled to a 3D laser sensor, the three-dimensional image being obtained by associating, with each point of the image of the camera, distance information acquired by the 3D laser sensor.

Figure 2:
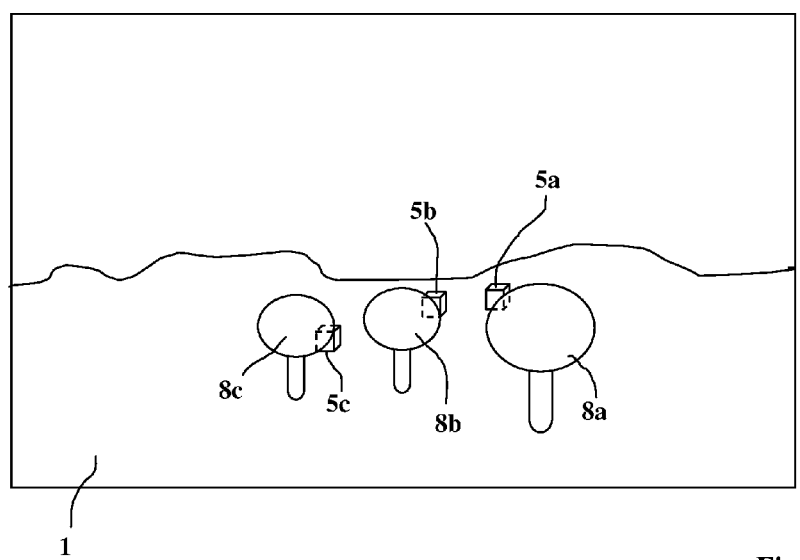
Figure 3:
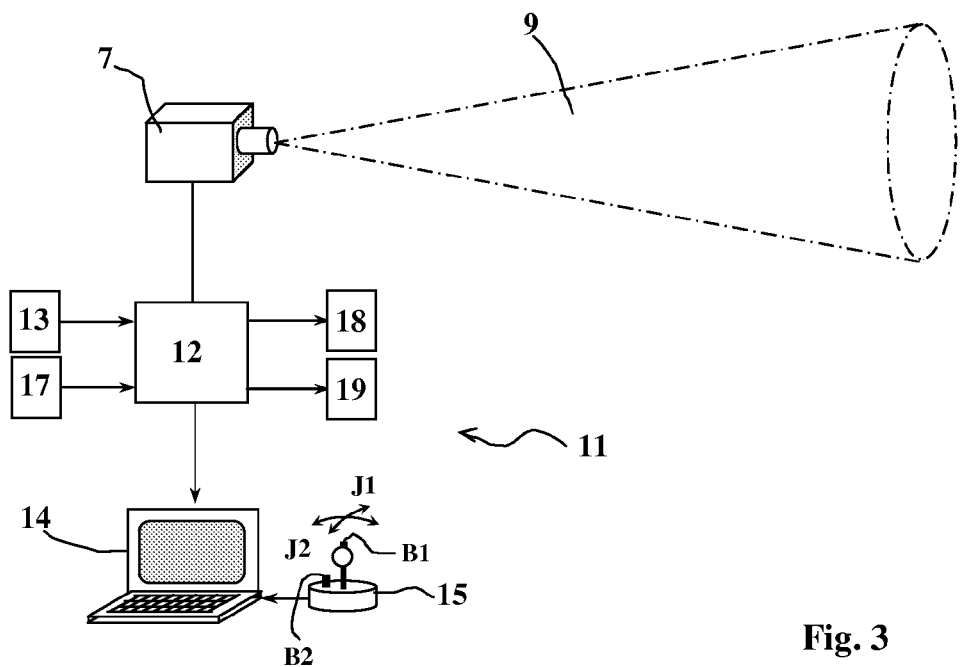
Figure 4:
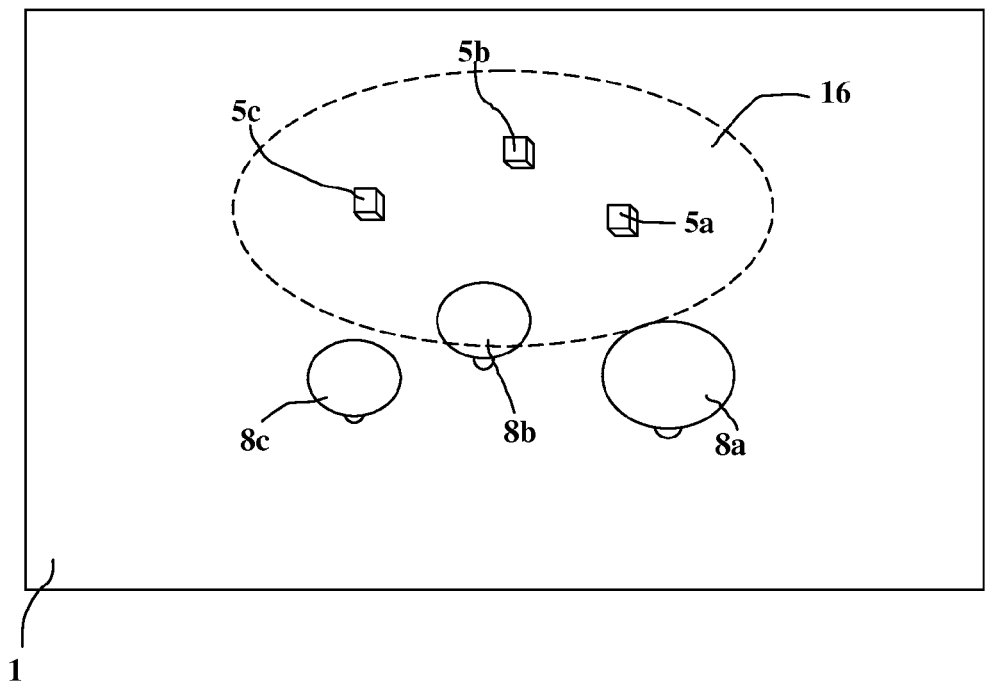

The invention will be better understood upon reading the following description of a particular embodiment, description made with reference to the appended drawings in which:

FIG. 1 shows a plot of land on which are located targets and a vehicle equipped with a weapon system and a fire control according to the invention, FIG. 2 shows an image of the land as visualized by the shooter from the fire control, and before the implementation of the invention, FIG. 3 is a diagram describing the architecture of the fire control according to the invention, FIG. 4 shows an image of the land after the implementation of the invention.

With reference to FIG. 1, a plot of land 1 has been shown, on which is located a vehicle 2 equipped with a turret 2a carrying a weapon barrel 3.

The weapon barrel 3 is for firing explosive projectiles 4 toward targets 5a, 5b, 5c dispersed on the land 1. Only one projectile 4 is shown here on its trajectory 6.

The weapon barrel can be oriented in elevation and in bearing with respect to the vehicle. The turret 2a can thus pivot along a vertical axis (bearing setting) and the barrel 3 can be tilted with respect to the turret 2a along a substantially horizontal axis (elevation setting). Appropriate motorizations are associated with these elevation and bearing settings of the weapon barrel 3.

The turret 2a also carries a means for observation 7 which is constituted here by a laser camera. This means for observation 7 is coupled to a fire control (not visible in FIG. 1) which is inside the turret 2a and which allows to control the motorizations ensuring the laying of the turret 2a and of the barrel 3 of the weapon toward the targets 5a, 5b, 5c.

The fire control will also ensure the programming of the projectiles fired by the barrel. This programming comprises the implementation, by a programming interface, in a memory of the projectile rocket, of a triggering moment of the projectile following the firing moment.

The targets 5a, 5b, 5c have small sizes, for example they are light vehicles or groups of infantry.

Furthermore, the targets are partially hidden with respect to the vehicle 2 by landscape elements, such as trees (or shrubs or bushes) 8a, 8b, 8c.

In FIG. 1 has been shown by a dotted cone 9 the observation sector of the means for observation 7. Thus, the means for observation 7 looks at the land along a direction S1 which is coincident with the axis of the cone 9.

FIG. 2 shows the image of the land 1 as it is directly provided on a screen of the fire control from the observation means 7.

It can be noted that the targets 5a, 5b, 5c are partially hidden by the trees 8a, 8b, 8c. A telemetry of the targets from the fire control is thus difficult or impossible.

The trees 8a, 8b, 8c intercept the laser telemetry signals, leading to a poor programming of the triggering moment of the projectile 4 on its trajectory.

A programming error leads to a significant decrease of the hit probability. It has been verified that, for a firing of a burst of projectiles with a medium caliber at a distance of about 1000 meters, a programming error of about ten meters led to a hit probability decrease which can reach 50%.

According to a feature of the invention, the means for observation 7 allows to perform a three-dimensional (3D) acquisition of the plot of land 1.

A means for observation which can perform such a 3D acquisition is already known.

As a means for observation can also be used an optical or thermal camera coupled to a sequence laser range-finder (or three-dimensional or 3D laser sensor), the observation direction of which is varied by a microscan. In this case, the three-dimensional image is obtained by associating, with each point of the image of the camera, distance information acquired by the laser range-finder.

After the acquisition of the scene by the means for observation 7, the fire control thus has not only a simple two-dimensional image such as visible in FIG. 2, but also a database of images with coordinates in three directions in space. This database can then, according to the invention, be used for reconstructing an image of the land along an observation direction different from the direction S1, for example along the bird's eye view direction S2 which is shown in FIG. 1 and which almost corresponds to an observation from a point Z located at the vertical of the means for observation 7.

FIG. 3 illustrates a fire control 11 according to the invention.

This fire control 11 is for providing the coordinates of the trigger point P for the projectile 4 on its trajectory.

It comprises the means for laser observation 7 which allows the three-dimensional acquisition of the coordinates of the plot of land 1 which is observed.

It also comprises a computer 12 which is coupled to second memory means 13 allowing to store the image database which is obtained after the acquisition of information by the means for observation 7.

The computer 12 incorporates an algorithm allowing to reconstruct at least one image of the plot of land 1, the coordinates of which have been acquired, which image is constructed along a bird's eye view observation direction (such as S2), for example from a point Z located at the vertical of the means for observation 7. This image is displayed on a means for visualization 14, such as a screen.

Is called "bird's eye view observation direction" an observation direction which is tilted from top to bottom toward the plot of land 1. Such an observation direction corresponds to that which would be obtained from an observation point (point Z) located higher than the means for observation 7, thus allowing to have a better visibility of the land.

The image is reconstructed, for example by geometrical projection on a plane perpendicular to the aiming direction S1.

The fire control 11 also comprises a means for control 15 made here in the form of a lever (or rudder bar) operable along two orthogonal directions J1 and J2. The rudder bar is for the user and firstly allows the latter to select the orientation of the observation direction S2.

FIG. 4 thus shows the land 1 observed along the bird's eye view direction S2. The visibility of the targets 5a, 5b and 5c has been increased.

The entire targets have been shown in FIG. 4. Such an image is of course possible only if the foliage of the trees 8a, 8b, 8c is not entirely opaque and it is thus possible to perform an acquisition of the data relative to the shape of the entire targets. If the targets are partially hidden and their shape hidden by the foliage is not accessible, the reconstructed image will include only the portions of the targets which are not hidden. However, this reconstructed image improves the vision of the land.

The relative distances between the targets and the trees can be evaluated. FIG. 4 shows a flat image projected on the plane of the figure. It is understood that the screen 14 of the fire control allows to visualize a relief image of the land, making full use of the three-dimensional information available in the image database 13.

Once an observation direction S2 has been selected, which can be performed by an action on a control switch B1 of the rudder bar 15, the user can, according to another feature of the invention, use the rudder bar 15 (or another actuator) for positioning and moving on the image of the land an area of effectiveness 16 (FIGS. 1 and 4).

This area 16 is an image, constructed by the computer 12, of a geometrical surface or volume which allows to visualize the area or volume of effectiveness of the splinters generated by the projectile considered when triggered at a trigger point P (FIG. 1).

This area of effectiveness has been shown in the figures in the form of a cone and its elliptical sections for simplifying the disclosure. It is understood that the volume which will be superimposed on the image of the land can have a different shape which will depend on the characteristics of the implemented projectile 4. The geometrical characteristics of the areas of effectiveness associated with different trigger points P are incorporated in first memory means 17 coupled to the computer 12.

It is conventional, during the definition of a projectile, to measure the distribution of the splinters generated by the explosion of the projectile at different distances therefrom.

Then, the area of effectiveness of a projectile fired at a given point can be geometrically modeled. For simplification purposes, the geometrical volume of the area will be selected such that it corresponds to a distribution of generated splinters allowing to ensure a given hit or neutralization probability. Such a probability corresponds, for example, to a minimum power level for the splinters and/or to a minimum splinter density.

It is understood that these data are specific to a given type of projectile and that they do not depend on the characteristics of the land 1 and the targets located thereon.

Thus, with any point in space, a geometrical volume 16 corresponding to the desired hit probability can systematically be associated. However, this modeling of the area of effectiveness is generally implemented only during the projectile design steps. The invention proposes to operationally implement it at a fire control.

According to the invention, this volume 16 is moved by the user on the two- or three-dimensional image of the land 1 as it has been reconstructed. This image of the area of effectiveness 16 is semi-transparent and so does not hide the potential targets 5a, 5b, 5c. It also can have a color different from that of the rest of the image so as to facilitate its visualization.

Thus, the user can easily move the area of effectiveness 16 so as to determine the position allowing to neutralize one or more targets with the desired hit probability.

When moving the area 16 using the rudder bar 15, the computer 12 continuously determines the coordinates of the trigger point P corresponding to the positioning of the area of effectiveness 16. Indeed, these coordinates are closely associated with the geometry of the area 16 which is moved and, in fact, moving the area 16 corresponds to moving the point P.

When the user has selected a particular location for the area of effectiveness 16, he/she operates a means for validation (for example another switch B2).

Then, the computer 12 provides a laying module 18 and a programming module 19 with the coordinates of the trigger point P desired for the projectile.

These coordinates are conventionally used by the laying module 18 for controlling the elevation and bearing layings of the barrel of the weapon 3.

They are used by the programming module 19 for programming the triggering moment of the projectile 4 on its trajectory.

The invention has been described for simplification purposes in an application for controlling the triggering of a single projectile.

It can be similarly implemented for controlling the firing of a burst of projectiles. A burst comprises a number of projectiles (4 to 10 for example) which are successively fired at the rate of fire of the weapon.

As it is possible by design to define an area of effectiveness of a single projectile, it is also possible to define an area of effectiveness for a burst comprising a number of projectiles of a given type.

The means of the invention are implemented in the same way as described above.

However, what is visualized on the screen is no longer the area of effectiveness of a single projectile but that of a burst. The trigger point P thus corresponds to an average point, barycenter of the trigger points of the different projectiles of the burst. From the selection of the area of effectiveness can also be defined in the fire control a burst ensuring a triggering with a static distribution of the triggering moments of the projectiles of the burst.

Once the positioning of the area of effectiveness 16 is performed by the user, the computer 12 transmits, as previously described, to the laying module 18 and the programming module 19 the different firing parameters (laying angles) and burst management parameters (programming of the triggering moment of each projectile).

The invention claimed is:

1. A method for acquiring the coordinates of a trigger point of a projectile or of a burst of projectiles on trajectory and above a plot of land on which a target is located, the method comprising the following steps:
    performing a three-dimensional acquisition of the plot of land using a means for laser observation,
    constructing by calculation from this acquisition, and then displaying on a means for visualization for an operator, an image of the plot of land from a bird's eye view observation direction, that is, an observation direction from a point located at the vertical and higher than the means for observation,
    positioning, in a manner changeable by the operator, on the thus-calculated image an area of effectiveness which is an image of a geometrical surface or volume allowing to visualize the area or volume of effectiveness of the projectile or of the burst considered when triggered at a trigger point,
    recovering the coordinates of the trigger point desired for the projectile or the burst when the operator has selected the location that suits him after having moved said area on the image of the land.

2. The method according to claim 1, wherein the orientation of the observation direction can be changed by the operator during the acquisition.

3. A fire control which can be associated with a weapon firing projectiles or bursts of projectiles and allowing to provide the coordinates of a trigger point for a projectile or a burst fired by the weapon, fire control implementing the method according to claim 1 and wherein it comprises:
    at least one means for laser observation allowing the three-dimensional acquisition of the coordinates of an observed plot of land,
    a computer which can reconstruct using an appropriate algorithm at least one image of the plot of land, the coordinates of which have been acquired, which image is displayed on a means for visualization from a bird's eye view observation direction, that is, an observation direction from a point located at the vertical and higher than the means for observation,
    a means for control for a user and allowing to position and move on the image of the land an area of effectiveness which is itself an image of a geometrical surface or volume allowing to visualize the area or volume of effectiveness of the projectile or of the burst considered when triggered at a trigger point,
    the computer continuously determining the coordinates of the trigger point when the area of effectiveness is moved by the operator,
    a means for validation allowing the user to select a particular location of the area of effectiveness, the computer then providing the coordinates of the trigger point desired for the projectile or the burst.

4. The fire control according to claim 3, wherein the computer is associated with first memory means which incorporate a geometrical modeling of the areas of effectiveness for the projectiles or bursts of projectiles associated with different trigger points.

5. The fire control according to claim 4, wherein the means for control allow to change the orientation of the observation direction during the acquisition by an operator.

6. The fire control according to claim 3, wherein the image of the area of effectiveness is semi-transparent.

7. The fire control according to claim 6, wherein the image of the area of effectiveness has a color different from that of the rest of the image.

8. The fire control according to claim 3, wherein the means for observation is an optical or thermal camera coupled to a 3D laser sensor, the three-dimensional image being obtained by associating, with each point of the image of the camera, distance information acquired by the 3D laser sensor.

* * * * *